Jan. 22, 1963 R. E. BEGER 3,074,664
CLOSED FACE SPINNING REEL
Filed Jan. 11, 1960 2 Sheets-Sheet 2
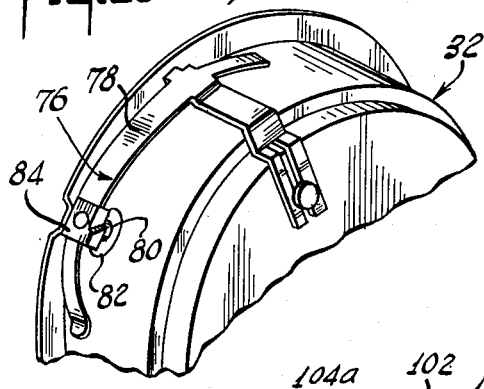
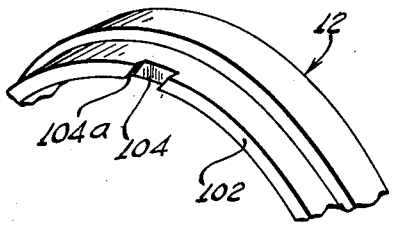
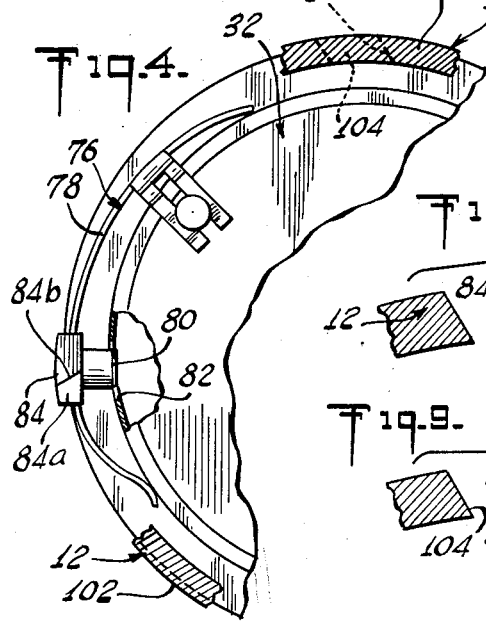
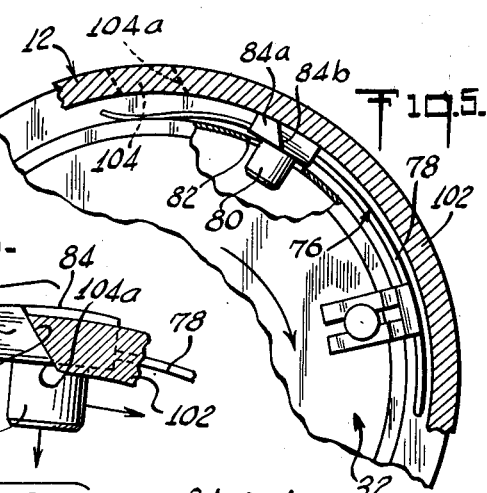
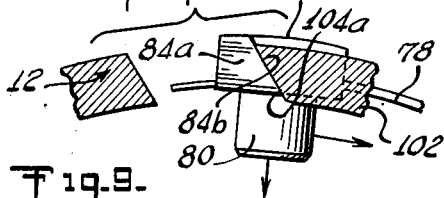
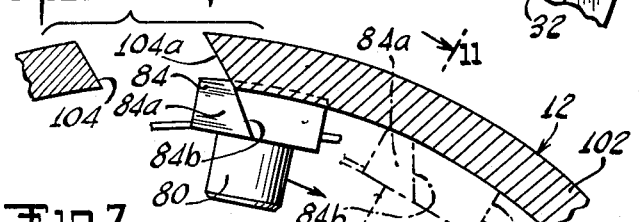
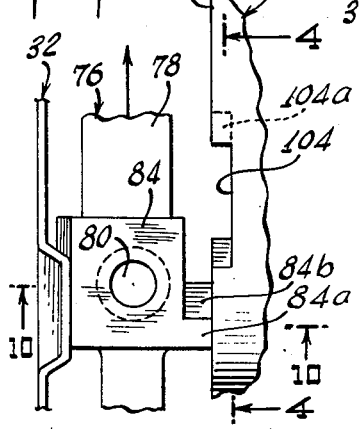
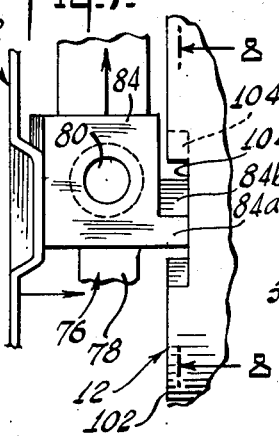
INVENTOR
RICHARD E. BEGER
BY
Moses, Nolte, & Nolte
ATTORNEYS United States Patent Office 3,074,664
Patented Jan. 22, 1963

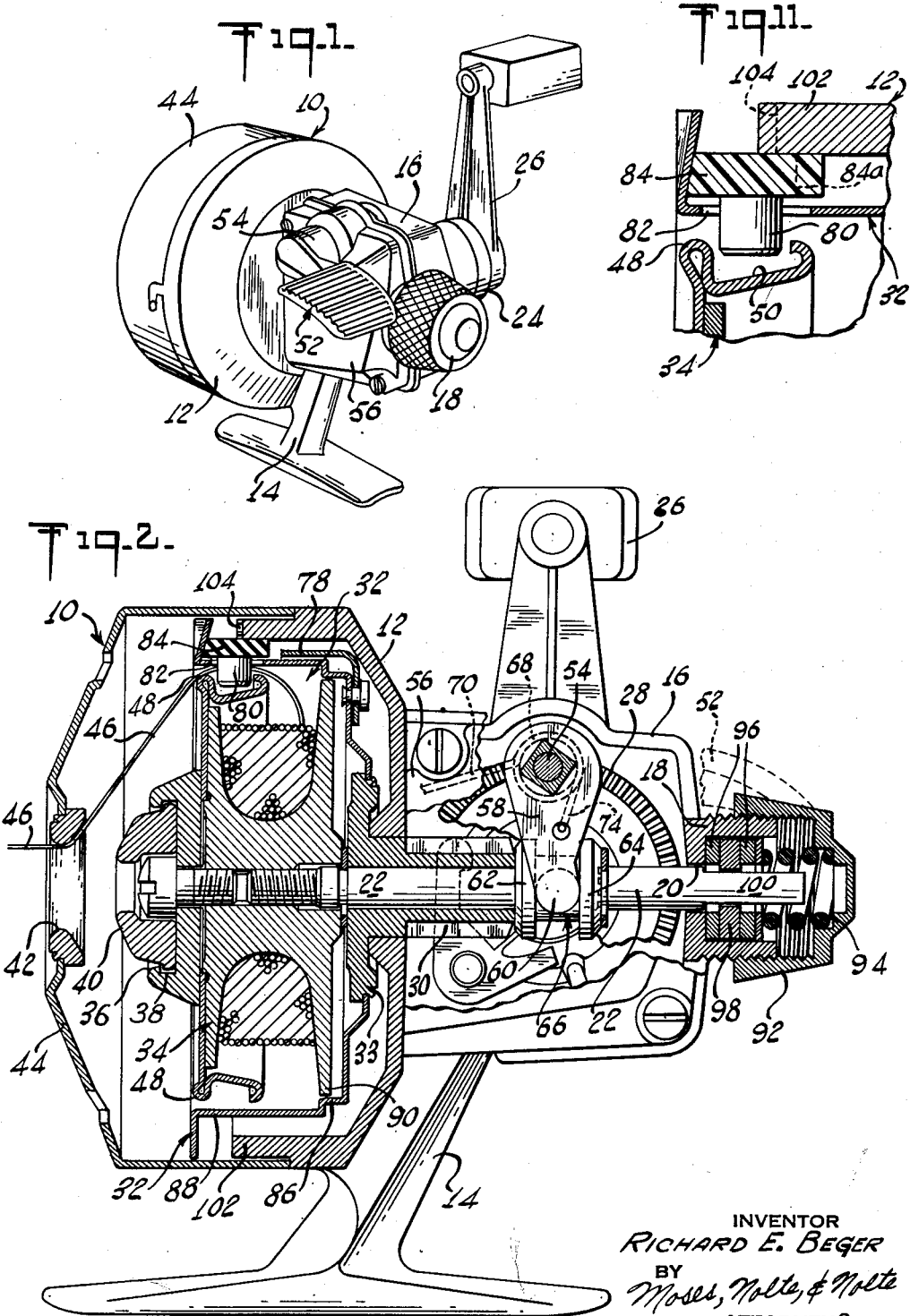

3,074,664
CLOSED FACE SPINNING REEL
Richard E. Beger, Jersey City, N.J., assignor to The Lionel Corporation, New York, N.Y., a corporation of New York
Filed Jan. 11, 1960, Ser. No. 1,479
6 Claims. (Cl. 242—84.2)

This application relates in general to fishing reels and in particular to a closed face bail casting reel, having an improved reliable line pickup mechanism and including means for insuring that the line does not slip behind the spool during the operation, and further having means for effecting the easy removal and replacement of the spool.

The present invention is an improvement over fishing reels of this type particularly in the mechanism for the reliable operation of the pickup bail for winding onto an enclosed spool. The spool is provided with an annular grooved area on the forward face over the top of which the line is fed when it is cast. The spool is supported for rotation within a rotatable cup member which carries a line pickup mechanism. Means are provided to move the cup outwardly and to cause the pickup member to move out of the groove of the spool and to permit free unreeling of the line during the casting operation. As soon as the fishing reel crank is wound to retrieve the line, the bail mechanism is moved around in contact with the interior surface of the outer cover which includes a cam portion which effects the movement of the bail down into the groove of the reel as the cup is rotated by the crank to commence the winding in of the line.

A further feature of the present invention is the provision of simple means for varying the drag on the line through an adjustable friction clutch mechanism which retards the movement of the shaft upon which the rotating cup member is mounted.

Accordingly, it is an object of this invention to provide an improved fishing reel.

A further object of the invention is to provide an improved fishing reel of the enclosed spool type including means for feeding line over an annular grooved portion of the end of the spool and including an improved pickup member for retrieving the line which is automatically moved down into the groove for winding in of the line before the crank handle of the reel has been wound one revolution.

A further object of this invention is to provide a fishing reel which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use reference should be had to the accompanying drawings and descriptive matter in which there is illustrated and described a preferred embodiment of the invention.

In the drawings:

FIG. 1 is a perspective view of a fishing reel constructed in accordance with the invention;

FIG. 2 is an enlarged longitudinal section of the fishing reel indicated in FIG. 1;

FIG. 3 is a separated perspective view of a portion of the outside cover member and internal cup;

FIG. 4 is a fragmentary section taken on the line 4—4 of FIG. 6 with the mechanism indicated in a cast position;

FIG. 5 is a view similar to FIG. 4, but with the mechanism indicated in an advanced retrieve position;

FIG. 6 is a fragmentary top plan of a portion of a cover and pickup member with the pickup member indicated in a cast position;

FIG. 7 is a view similar to FIG. 6 but with the pickup member shown approaching a cam portion of the cover prior to being directed into a retrieve position;

FIG. 8 is a section taken along the line 8—8 of FIG. 7;

FIG. 9 is a view similar to FIG. 8 but with the pickup member shown being directed to a retrieve position;

FIG. 10 is a section taken along the line 10—10 of FIG. 6; and

FIG. 11 is a section taken along the line 11—11 of FIG. 9.

Referring to the drawings in particular the invention as embodied therein includes a closed face spinning reel generally designated 10 which comprises a one-piece casting including a cylindrical cover portion 12, a post portion 14, and a substantially rectangular housing portion 16. The housing portion 16 includes an outwardly extending cylindrical combination bearing and brake housing 18 which is provided with an opening 20 to rotatably support one end of a main shaft or rod 22. The opposite end of the shaft 22 extends through a central opening in the cover 12.

One side of the housing 16 includes an outwardly extending cylindrical crank handle bearing support portion 24 which receives the shaft portion (not shown) of a hand crank 26. On the inner end of the shaft of the hand crank 26 is positioned an annular side faced gear 28 which meshes with an elongated pinion 30 which is freely rotatable on the shaft 22. The pinion 30 is of a length to permit its axial movement along with the shaft 22 between a forward position for casting and line braking, to a rearward position for retrieving the line, without moving out of meshing engagement with the gear 28.

In accordance with the invention a rotating cup member generally designated 32 is affixed to a hub portion 33 of the pinion 30 for rotation therewith. The cup includes an open end portion which accommodates a spool member generally designated 34. The spool member 34 is provided with a central opening which fits over a threaded stud end portion of the normally stationary shaft 22. The spool member 34 is affixed to the shaft and threaded thereon. The spool 34 remains stationary when the cup member 32 is rotated on its pinion sleeve 30 by the gear 28.

A substantially conical snubber-boss 36 is affixed to the forward end of the spool 34 and it includes a substantially cylindrical recessed forward face 38 which receives a resilient snubber member 40. The snubber member may be pressed into contact with the rim portion of an eyelet 42 which forms part of a removable front cylindrical cover member 44. Fish line 46 which is wound on the spool 34 is fed over an annular rim portion 48 having an annular groove 50 and through the eyelet 42.

The complete spool and cup member assembly within the cover portions 12 and 44 may be reciprocated from the position indicated in FIG. 2 to a forward position at which the snubber 40 is located in contact with the eyelet 42 to brake the line 46. This is accomplished by means of a thumb lever generally designated 52 (FIG. 1) which includes a central shaft portion 54 which is journaled in a removable coverplate 56 of the rectangular housing portion 16. The thumb lever member 52 includes an arm 58 which extends downwardly into the interior of the housing 16 and includes a cylindrical outstanding portion 60 which is located between spaced collar portions 62 and 64 of a sleeve member generally designated 66 which is affixed to the shaft 22. The collar 62 abuts the end of the pinion 30. The thumb lever 52 is biased in an upward direction as indicated in FIG. 1, and the arm 58 is bised in a direction toward the combination cylindrical housing support and clutch housing 18, by a coil spring 68 which is coiled around the shaft portion 54 and includes one end 70 which is biased against a portion of the rectangular plate 56 and another end 74 which biases the arm 58 rearwardly.

When it is desired to cast the line 46 so that it spools off the end of the spool 34, the thumb lever 52 is pushed downwardly to cause the cup member 32 and the spool 34 to move forwardly within the cover member 12.

In accordance with the invention, a bail pin assembly generally designated 76 is affixed to a rear face of the cup member 32 and includes a resilient portion 78 (FIG. 3) which is biased outwardly from the side face of the cup member. A bail pin 80 is affixed to the resilient portion 78 and extends downwardly therefrom through an opening 82 in the cup member 32. The pin 80 depends from a plate including a flat cam portion 84 which normally rides in contact with the internal face fo the cover 12 when the crank 26 is rotated as indicated in FIG. 2. In this position the line 46 is wound upon the spool 34 as the pin 80 is moved around the groove 50 by rotation of the crank 26. The line 46 is thus directed around the spool by the pin 80 as the cup member 32 is rotated.

A feature of the present invention is the construction of the cup member which includes an internal portion 86 of slightly less diameter than the outer diameter portion 88. The portion 86 is of slight longitudinal extent and provides a ledge which is closely spaced from the outer end of an internal edge 90 of the spool 34. With such a construction the outer edge 90 rides closely adjacent to the internal diameter portion 86 and it is impossible for any line 46 to become jammed between the spool 34 and the cup member 32.

A feature of the invention is the provision of a control knob 92 for regulating the drag on the line 46 when the mechanism is in a retrieve position as indicated in FIG. 2. The control knob 92 includes an internal portion in contact with a spring 94. The opposite end of the spring 94 is biased against one edge of a friction disc assembly which includes friction washers 96 on each side of a drag washer 98. The drag washer 98 includes a square-cut central opening which fits over a squared portion 100 of the shaft 22. When the spring 94 is tightened by the control knob 92 the washer assembly is held tightly against the inner end of the housing 18 and, depending on the adjustment of the compression on spring 94, they retard the rotation of shaft 22. Since the spool 34 is affixed to the shaft 22, it may rotate an amount which depends on the force on the line 46 and the compression of the spring 94 as controlled by the knob 92. Thus, accurate adjustment of the drag on the line is obtained.

When it is desired to move the mechanism to a cast position the thumb lever 52 is pushed downwardly to cause the cup assembly 32 and the spool 34 to be moved in a direction toward the end cover 44. This causes the cam portion 84 of the bail pin 80 to move from under the smaller diameter interior portion of the cover plate 12 to the larger internal diameter portion of the cover member 44 and to effect movement of the bail pin 80 radially outwardly out of the groove 50. The line 46 may then spool off the end of the spool 34 without hindrance. When it is desired to slow down the payout of the line the thumb lever 52 is deflected further to cause the snubber member 40 to move into the eyelet 42 and effectively brake the line 46.

When it is desired to retrieve the line 46 the hand crank 26 is turned. This causes the button portion 84 of the bail pin 80 to move around with the cam portion in contact with a rim 102 of the cover portion 12 with the button 84 being biased against this edge by the action of the coil spring 68. The coil spring 68 causes the lever arm 58 to be biased backwardly and effects the rearward biasing of the shaft 22, the spool 34, and the cup member 32 with the bail pin 80. The button portion 84 rides around the rim 102 until it approaches a notched area 104 provided in the rim 102. The portion 84 includes a laterally extending cam portion 84a which has a beveled forward face 84b (FIG. 6). When the button portion 84 proceeds beyond the position indicated in FIG. 6 to the position indicated in FIGS. 7, 8 and 9, the beveled portion 84b contacts a similar beveled portion 104a of the notch 104 which effects the downward deflection of the bail pin 80 and the button 84 to cause the top surface of the button 84 to move beneath the internal face of the cover member 12. While the button is being shifted downwardly, the force of the spring 68 causes the shaft 22 with the cup member 32 and spool 34 to move rearwardly to again bring the bail button 80 to the return position indicated in FIG. 2 with the button 80 centered with the groove 50. In this position the line 46 may be easily wound on the spool 34 by rotation of the crank 26.

Thus, it can be seen that the invention provides an enclosed spool type of casting reel in which the mechanism is greatly simplified. By arranging the bail pin on the cup member so that it may be cammed by a portion of the cover member 12, simple and reliable operation for the retrieving of the line 46 is accomplished. The invention provides an arrangement in which the spool 34 may be easily removed from the cover and associated mechanism in order to replace or examine the line 46. This is done by tightening up on the friction drag means of the control knob 32 and unscrewing the spool 34 from the shaft 22. Means are provided to insure that when the spool 34 is in an operative position that the line does not foul on the edge of the spool and the interior of the cup member 32. This is achieved by designing the cup member with varied internal diameter portions in order to form a ledge which rides in close abutment with the inner edge of the spool member to prevent the line from moving off the spool at this location.

While a specific embodiment of the invention has been shown and described in detail to illustrate the application of the invention principles, it will be understood that the invention may be embodied otherwise without departing from such principles.

What is claimed is:

1. A fishing reel comprising a substantially cylindrical cover member having a central opening, a shaft extending through said opening, a line spool affixed to said shaft, said line spool having a forward rim portion with an annular groove therein, a cup member within said cylindrical cover extending over one end of said spool and being freely rotatable on said shaft, said cup member having an opening in a side wall thereof, a line pickup member resiliently mounted on an exterior face of said cup member adjacent said opening and being biased downwardly by the interior wall of said cover into said cup member opening and into the annular groove of said spool when in a retrieve position, means to guide line from said spool over said rim portion of said spool and in a direction outwardly from the uncovered end of said spool, means to rotate said cup member with said pickup member thereon to retrieve line, and means to move said cup member forwardly to bring said pickup member out of contact with the interior wall of said cover to permit said pickup member to move out of said groove and permit free spooling of line off said spool.

2. A fishing reel according to claim 1 wherein said cover member includes a cam surface and including resilient means to urge said cup member with said pickup member in a direction to maintain said pickup member in contact with the cam surface of said cover, said cam surface being shaped to direct said pickup member downwardly into the annular groove of said spool upon actuation of said means to rotate said cup member.

3. A fishing reel according to claim 1 wherein said shaft is axially slidable and said last named means comprises thumb lever means to shift said shaft and said cup member axially, and spring means to bias said shaft to a retrieve position.

4. A fishing reel according to claim 1 wherein said cover member includes a cylindrical rear cover portion and a complementary cylindrical forward cover portion of larger internal diameter connected thereto, said forward cover portion including a central eyelet opening forming said line guiding means.

5. A fishing reel according to claim 4 wherein said spool includes a beveled snubber portion on its forward face which is movable into the eyelet of said cover member.

6. A fishing reel comprising a substantially cylindrical cover having a central opening, a shaft member axially slidable in said opening, a line spool affixed to said shaft at a location within said cover member, said line spool having a forward rim portion with an annular groove thereon, an independently rotatable cup member freely rotatable on said shaft and extending over one end of said spool, said cup member having an opening in a side wall thereof in alignment with said groove, a line pickup member resiliently mounted on an exterior face of said cup member above said opening and biased downwardly by the interior wall of said cover member into said opening and into the annular groove of said spool when the latter is in a retrieve position, a complementary cover closing portion connected to said cover member and extending around the open side of said cup member and said spool and including a central eyelet opening, the line on said spool being guided around the rim of said spool and through said eyelet opening, hand crank means to rotate said cup member with said pickup member to cause the line to be wound on said spool when in a retrieve position, a thumb lever pivotally mounted on said reel with respect to said shaft and including a portion engageable with said shaft and said cup member to slide said cup member and said shaft from the retrieve position to a forward cast position, means to bias said shaft and said cup member to a retrieve position, said thumb lever means being depressible to move said cup member forwardly to bring said pickup member out of contact with the inner wall of said cover and to permit it to move out of said groove and permit free spooling of line off said spool, said pickup member and said cover member including complementary camming portions to return said pickup member to a retrieve position upon actuation of said hand crank means.

References Cited in the file of this patent

UNITED STATES PATENTS

| | | |
|---|---|---|
| 2,587,257 | Weisblatt | Feb. 26, 1952 |
| 2,652,990 | Ferguson | Sept. 22, 1953 |
| 2,656,992 | Keates | Oct. 27, 1953 |
| 2,675,192 | Hull | Apr. 13, 1954 |
| 2,772,839 | Morton | Dec. 4, 1956 |
| 2,863,617 | Chapin et al. | Dec. 9, 1958 |
| 2,903,202 | Sarah | Sept. 8, 1959 |
| 2,915,258 | Hull | Dec. 1, 1959 |
| 2,991,957 | Hull | July 11, 1961 |

FOREIGN PATENTS

| | | |
|---|---|---|
| 901,487 | France | Nov. 6, 1944 |